(12) United States Patent
Roczniak et al.

(10) Patent No.: US 8,863,929 B2
(45) Date of Patent: Oct. 21, 2014

(54) VISCOUS TWO-SPEED CLUTCH

(75) Inventors: Paul Roczniak, Perham, MN (US);
Thomas M. Jagger, Golden Valley, MN (US); Craig M. Swanson, Perham, MN (US)

(73) Assignee: Kit Masters, Perham, MN (US)

( * ) Notice: Subject to any disclaimer, the term of this patent is extended or adjusted under 35 U.S.C. 154(b) by 273 days.

(21) Appl. No.: 13/335,621

(22) Filed: Dec. 22, 2011

(65) Prior Publication Data

US 2012/0164002 A1 Jun. 28, 2012

Related U.S. Application Data

(60) Provisional application No. 61/426,437, filed on Dec. 22, 2010.

(51) Int. Cl.
*F16D 47/06* (2006.01)
*F04D 25/02* (2006.01)
*F16D 35/02* (2006.01)
*F16D 25/0632* (2006.01)

(52) U.S. Cl.
CPC .............. *F16D 35/02* (2013.01); *F04D 25/022* (2013.01); *F16D 47/06* (2013.01); *F16D 25/0632* (2013.01)
USPC ......................................... 192/57; 192/85.37

(58) Field of Classification Search
USPC ...................... 192/57, 85.37, 58.43
See application file for complete search history.

(56) References Cited

U.S. PATENT DOCUMENTS

| | | | | | |
|---|---|---|---|---|---|
| 3,272,188 | A | * | 9/1966 | Sabat | 123/41.11 |
| 3,498,431 | A | * | 3/1970 | Sutaruk | 192/57 |
| 4,526,257 | A | * | 7/1985 | Mueller | 192/57 |
| 4,638,900 | A | * | 1/1987 | Deem et al. | 192/85.53 |
| 5,586,636 | A | * | 12/1996 | Linnig | 192/48.2 |
| 2009/0183963 | A1 | * | 7/2009 | Swanson et al. | 192/48.2 |

* cited by examiner

*Primary Examiner* — Rodney H Bonck
(74) *Attorney, Agent, or Firm* — Oblon, Spivak, McClelland, Maier & Neustadt, L.L.P.

(57) ABSTRACT

Some embodiments of a clutch system may drive an output portion to rotate at a first rotational speed when the clutch surfaces are engaged and to rotate at a second rotational speed when the clutch surfaces are shifted to a disengaged position. The viscous two-speed clutch system may employ a viscous drive system that causes the output portion to rotate even when the clutch surfaces are disengaged. In such circumstances, the cooling fan can be driven to rotate at a first rotation speed due to interconnection with a drive source and to rotate at a second rotational speed even when the clutch surfaces are disengaged. Thus, the clutch system facilitates the flow of cooling air both when the vehicle cooling system activates the fan (e.g. by causing the clutch surface to engage) and when the vehicle cooling system deactivates the fan (e.g. by causing the clutch surfaces to disengage).

9 Claims, 10 Drawing Sheets

VISCOUS TWO-SPEED CLUTCH

CROSS-REFERENCE TO RELATED APPLICATIONS

This application claims priority to U.S. Provisional Application No. 61/426,437, filed on Dec. 22, 2010, the entire content of which is incorporated in the present document by reference.

BACKGROUND

Vehicle transmission systems, cooling systems, and braking systems often use clutches or like devices to selectively transmit rotational forces from a drive shaft to an output member. Conventional clutch devices include an opposing pair of engagement surfaces that can be compelled toward or away from one another using an electrical, mechanical, pneumatic, or hydraulic actuation system. In general, the actuation system causes some relative axial shifting within the clutch device. Such axial movement is used to engage (or disengage) the opposing engagement surfaces, which rotationally interconnect (or rotationally disconnect) the drive shaft and the output member.

In general, the clutch can be operated to engage (or disengage) opposing clutch surfaces, which rotationally interconnect (or rotationally disconnect) the drive pulley and the output member. In an example related to fan clutches, when the clutch surfaces are shifted to the engaged position, the output member (carrying fan blades) is driven to rotate along with the drive pulley. However, when the clutch surfaces are shifted to the disengaged position, the output member is no longer directly urged by the drive pulley and may be free to stop rotating.

In clutch devices using pneumatic or hydraulic actuated systems, a piston may be acted upon by a set of springs to bias the piston toward one of the engaged or disengaged positions. Fluid pressure may act upon the piston, in a direction opposite to that of the spring force, to cause the piston portion to be axially shifted. Such axial movement is used to engage (or disengage) the opposing engagement surfaces, thus selectively controlling the rotation between the rotation between the drive shaft and the output member.

A viscous coupling includes a set of plates inside a sealed housing filled with a shearing fluid, where one set of plates is connected to an input rotating mechanism and the other set of plates is connected to an output mechanism. The shearing fluid, between the plates, causes drag between the slower set of plates (e.g., the output) and the faster set of plates (e.g., the input), providing torque transfer from the input mechanism to the output mechanism. The shearing fluid may be a heat-sensitive material, such as a silicone gel, that thickens and expands under heated conditions. Thus, when the shearing fluid "shears," or churns, the fluid thickens and expands quickly to transfer substantial force between the input member and the output member.

SUMMARY OF ILLUSTRATIVE EMBODIMENTS

Some embodiments of a clutch system may drive an output portion to rotate at a first rotational speed when the clutch surfaces are engaged and to rotate at a second rotational speed when the clutch surfaces are shifted to a disengaged position. In some implementations, the viscous two-speed clutch system may employ a viscous drive system that causes the output portion to rotate even when the clutch surfaces are disengaged. The viscous two-speed clutch device can be useful, for example, to control the rotation of a cooling fan in a vehicle cooling system. In such circumstances, the cooling fan can be driven to rotate at a first rotation speed due to interconnection with a drive source or the like and to rotate at a second rotational speed even when the clutch surfaces are disengaged. Thus, the clutch system facilitates the flow of cooling air both when the vehicle cooling system activates the fan (e.g. by causing the clutch surface to engage) and when the vehicle cooling system deactivates the fan (e.g. by causing the clutch surfaces to disengage).

In some implementations, a viscous two-speed clutch includes a drive member that causes the lower housing, the rotor mechanism, and also the fan plate to rotate at the first rotational speed when a pneumatic control system biases the piston in the first position. In another circumstance, when the piston is actuated into the second position, the lower housing can drive the rotor mechanism at the second rotational speed through the shearing force of the shearing fluid.

In some embodiments, the fan clutch includes an input plate which is attached to a drive pulley so that the input portion rotates with the drive pulley, a top housing attached to the input plate so that the top housing rotates with the drive pulley, a piston which is movable between a first position and a second position, a clutch ring with an engagement surface which engages and disengages an opposing surface of the input plate, a fan shaft connected to the clutch ring, a spring provided between the clutch ring and the fan shaft, a fan plate connected to the fan shaft, a fan device connected to the fan plate, and a shearing fluid provided in a space between the top housing and the clutch ring. When the piston is in the first position, the engagement surface of the clutch ring engages the opposing surface of the input plate such that the clutch ring rotates at a first rotational speed substantially equal to a rotational speed of the drive pulley. When the piston is in the second position, the engagement surface of the clutch ring disengages the opposing surface of the input plate, and a shearing force, provided by the shearing fluid due to rotation of the top housing, rotates the clutch ring at a second rotational speed less than the first rotational speed.

Some embodiments of the viscous clutch devices described herein can drive an output member to rotate at a first rotational speed when the clutch surfaces are engaged and to rotate at a second speed when the clutch surfaces are shifted to a disengaged position. In particular, the viscous clutch device can employ a viscous drive system that urges the output portion of the viscous clutch device to rotate at the second rotational speed (which may be slower than the first rotation speed.

Second, some embodiments of the viscous clutch device can be implemented with a cooling fan so as to provide different levels of air flow output from the cooling fan. For example, for vehicles that may frequently operate in idle states (e.g. buses and garbage trucks) or require additional cooling (e.g. automobiles driving in a hot weather or climbing a steep hill), the viscous clutch device can provide a continuous cooling to the engine even when the clutch is shifted to a disengaged position.

Third, in some implementations, the viscous clutch device may include a rotor compartment which houses a frustoconical surface that engages an opposing friction surface when the piston is in the first position so that the output portion is rotated at a first rotational speed with the input portion. A shearing fluid may be disposed in the rotor compartment. In selective embodiments, the shearing fluid may ease the engagement of the frustoconical surface and the opposing friction surface, thus extending the operational lifetime of the clutch device by reducing the abrasion, scuffing, and erosion of the frustoconical surface or the friction surface or possibly both.

Fourth, in particular embodiments, the viscous fan clutch device can provide additional cooling to the engine of a vehicle, for example, by operating the cooling fan when the clutch is shifted to a disengaged position. In such circumstances, the continuous cooling provided by the fan clutch device may reduce the frequency and the duration of the engaged position of the clutch. The continuous cooling may reduce the temperature fluctuation inside the engine compartment, and maintain the engine at a fuel efficient state for a longer period of time.

BRIEF DESCRIPTION OF THE DRAWINGS

These and other advantages of the invention will become more apparent and more readily appreciated from the following detailed description of the exemplary embodiments of the invention taken in conjunction with the accompanying drawings where.

DETAILED DESCRIPTION OF THE ILLUSTRATIVE EMBODIMENTS

Figure 1:
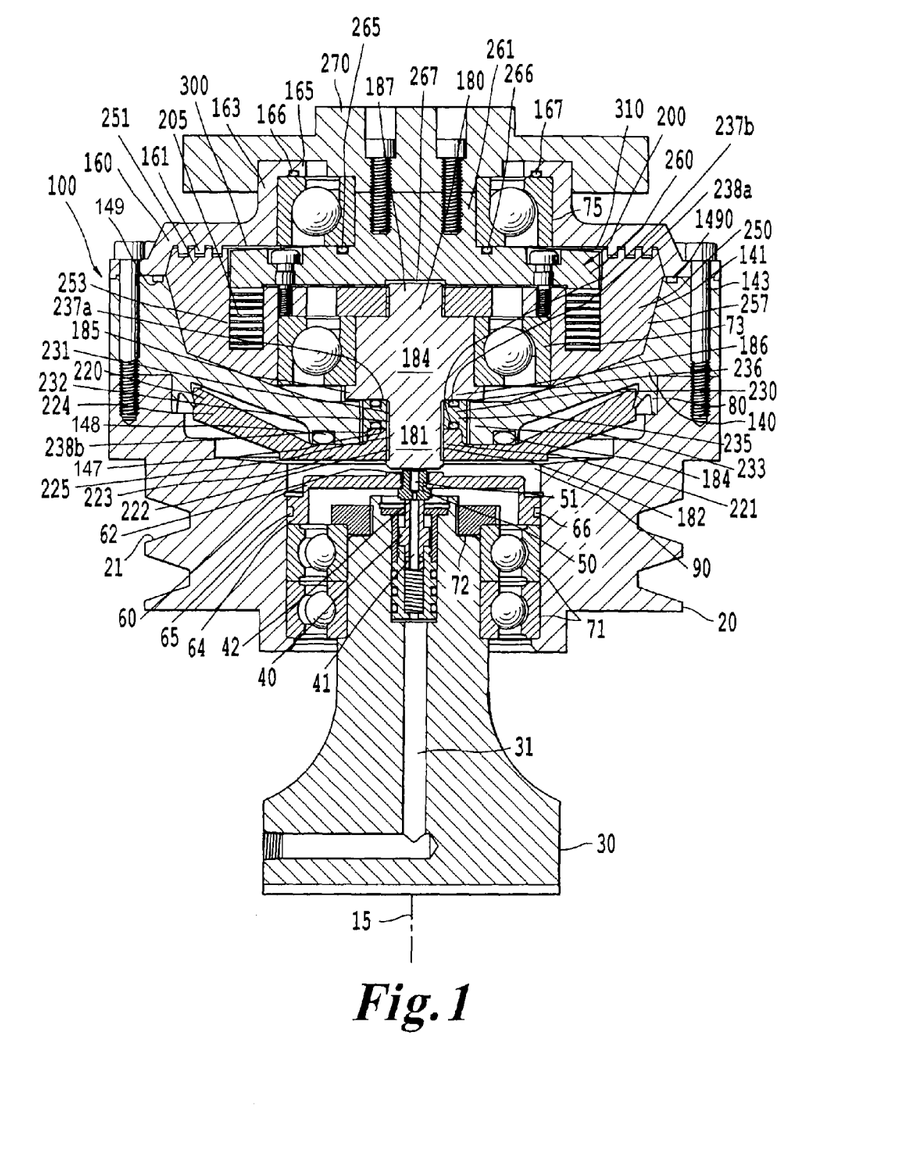
FIG. 1 is a cross-sectional view of a multi-speed clutch device.

With reference to FIG. 1, one example of a multi-speed clutch device 10 can provide rotational output at a first speed when a clutch ring 250 engages an opposing frictional surface 141 (i.e., on-stage) and can provide rotational output at a second speed when the clutch ring 250 disengages the opposing frictional surface 141 due to a viscous drive system 300 (i.e., drag-stage). In such circumstances, the multi-speed clutch device 10 can be controlled to provide rotational control, for example, to a cooling fan device 210 of an engine cooling system in a vehicle. Accordingly, the cooling fan 210 can be operated at the first speed when the clutch ring 250 engages the opposing frictional surface 141 to thereby rotate with a drive pulley 20 or other drive source. The cooling fan can be operated at the second speed when the clutch ring 250 disengages from the opposing frictional surface 141 due to the viscous drive system 300.

Such a multi-speed clutch system can be effective to provide different levels of air flow output from the cooling fan 210. For example, some vehicles may operate with extended periods of idle, such as buses, vocational equipment (e.g., garbage trucks), or construction equipment vehicles, so the cooling system may periodically activate the fan clutch to start rotation of the cooling fan. The high-speed rotation of the fan blades in these vehicles might be noticeably loud to both passengers (inside the vehicle cabin) and pedestrians (outside the vehicle cabin), especially when the vehicle is running at idle. However, the multi-speed clutch device 10 described herein can be implemented within the vehicle cooling systems so that the fan blades are rotated at a second speed even when the cooling system has not activated the multi-speed clutch device 10 to frictionally engage the clutch ring 250 with the opposing frictional surface 141. The second speed of the cooling fan 210 may be less than the first speed, and thus the noise from the cooling fan 210 may be reduced. Furthermore, the multi-speed clutch device 10 facilitates the flow of cooling air both when the vehicle cooling system activates the fan (e.g., by causing the clutch friction surfaces to engage) and when the vehicle cooling system deactivates the fan (e.g., by causing the clutch friction surfaces to disengage). Thus, the vehicle's engine temperature can be maintained below a threshold level for a greater period of time, which reduces the frequency that clutch device 10 must be activated by the cooling system to rotate the cooling fan at the first (and perhaps louder) speed.

In other words, the multi-speed clutch device 10 may operate at the first rotational speed when increased cooling is desired and may operate at the second rotational speed when increased cooling due to the multi-speed clutch device 10 is not desired. The multi-speed clutch device 10 may operate at the first rotational speed when a first operating condition is met; for example, the engine temperature is above a predetermined temperature threshold or a user desires increased cooling. Similarly, the multi-speed clutch device 10 may operate at the second rotational speed when a second operating condition is met; for example, the engine temperature is below a predetermined temperature threshold or a user does not desire increased cooling.

The operation of the multi-speed clutch device 10 between the first and second rotational speeds may be automatically controlled. For example, the multi-speed clutch device 10 may automatically engage if the engine temperature is above a threshold temperature and may automatically disengage if the engine temperature is below the threshold temperature.

The operation of the multi-speed clutch device 10 between the first and second rotational speeds may also be manually controlled. For example, the multi-speed clutch device 10 may engage if the user desires increased cooling and may disengage if the user does not desire increased cooling. The manual control may be performed using a switch or other type of controller in the vehicle.

Figure 2A:
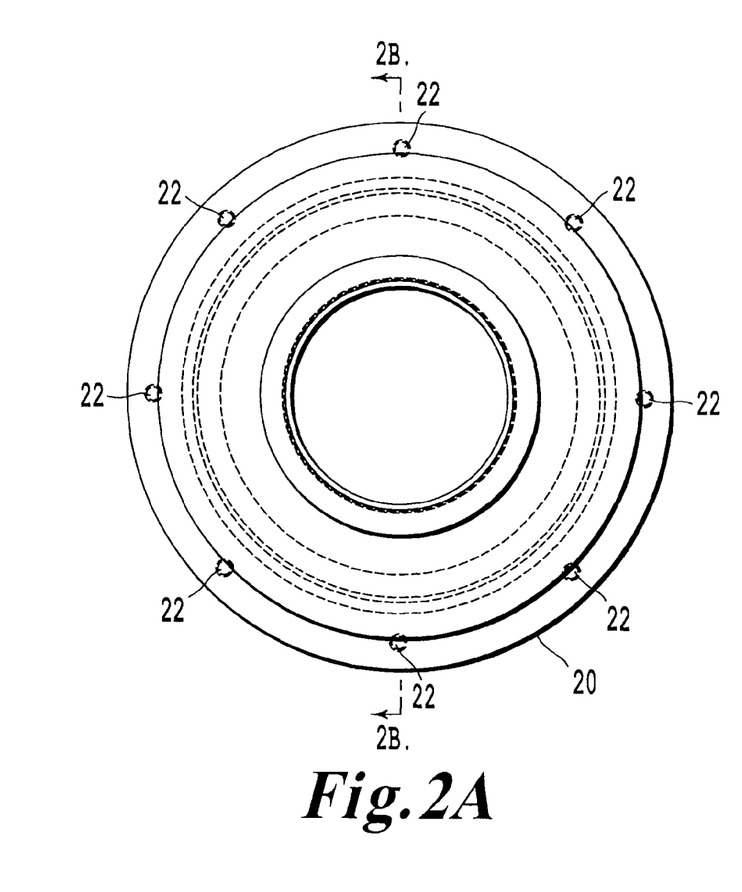
FIG. 2A is a plan view of a drive pulley.
Figure 2B:
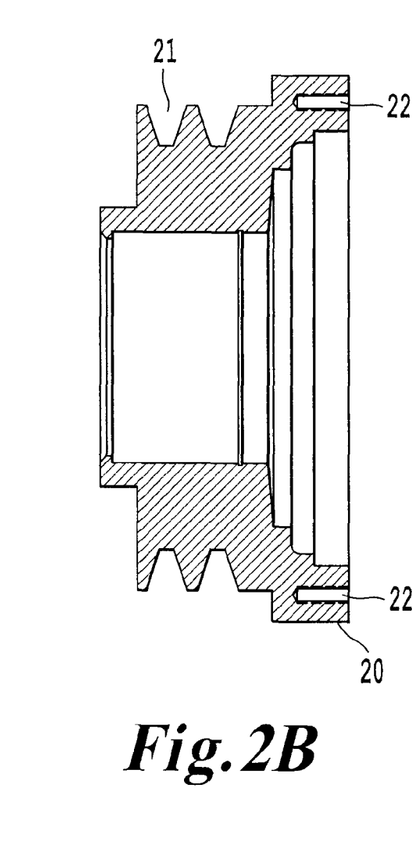
FIG. 2B is a cross-sectional view of the drive pulley.
Figures 3A, 3C:
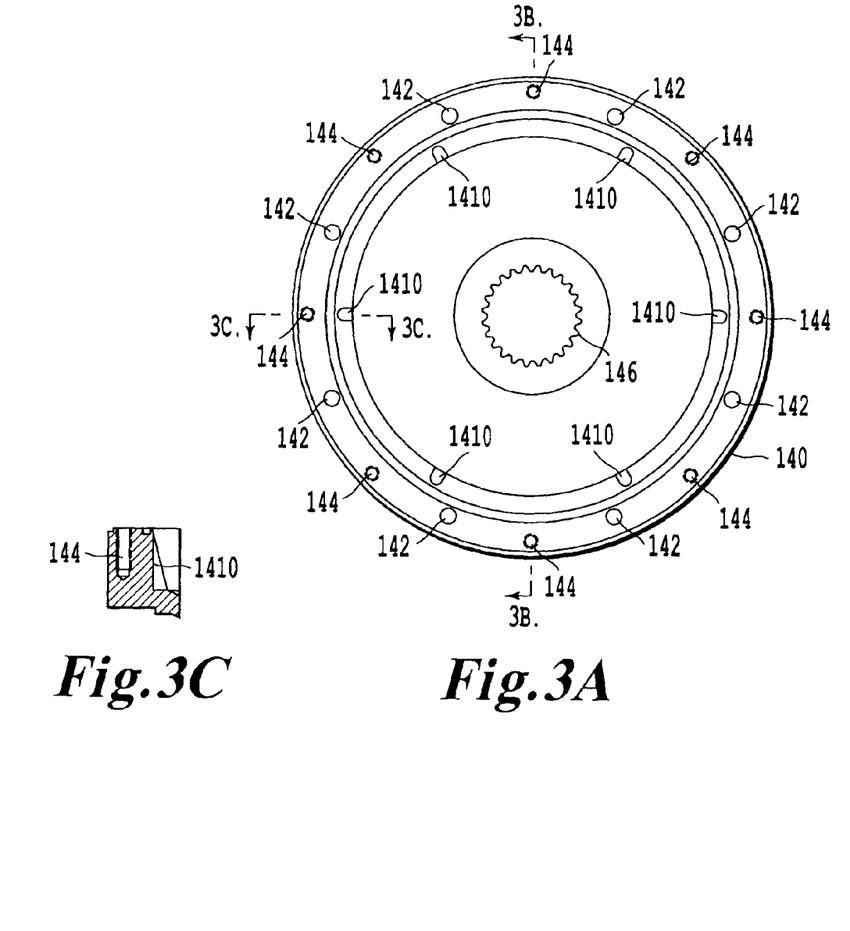
FIG. 3A is a plan view of an input plate.
FIG. 3C is another cross-sectional view of the input plate.
Figure 3B:
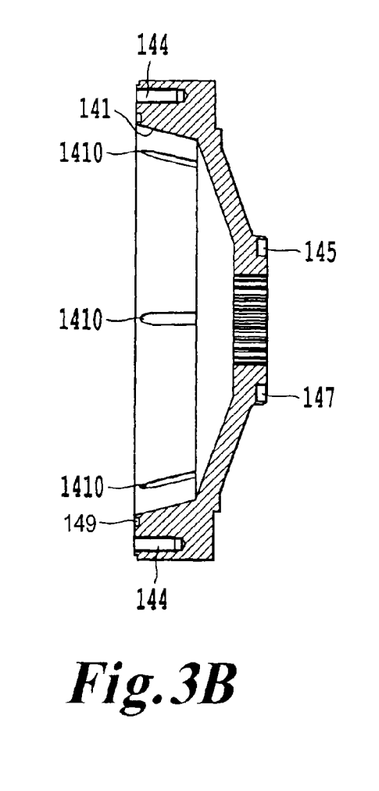
FIG. 3B is a cross-sectional view of the input plate.
Figure 4A:
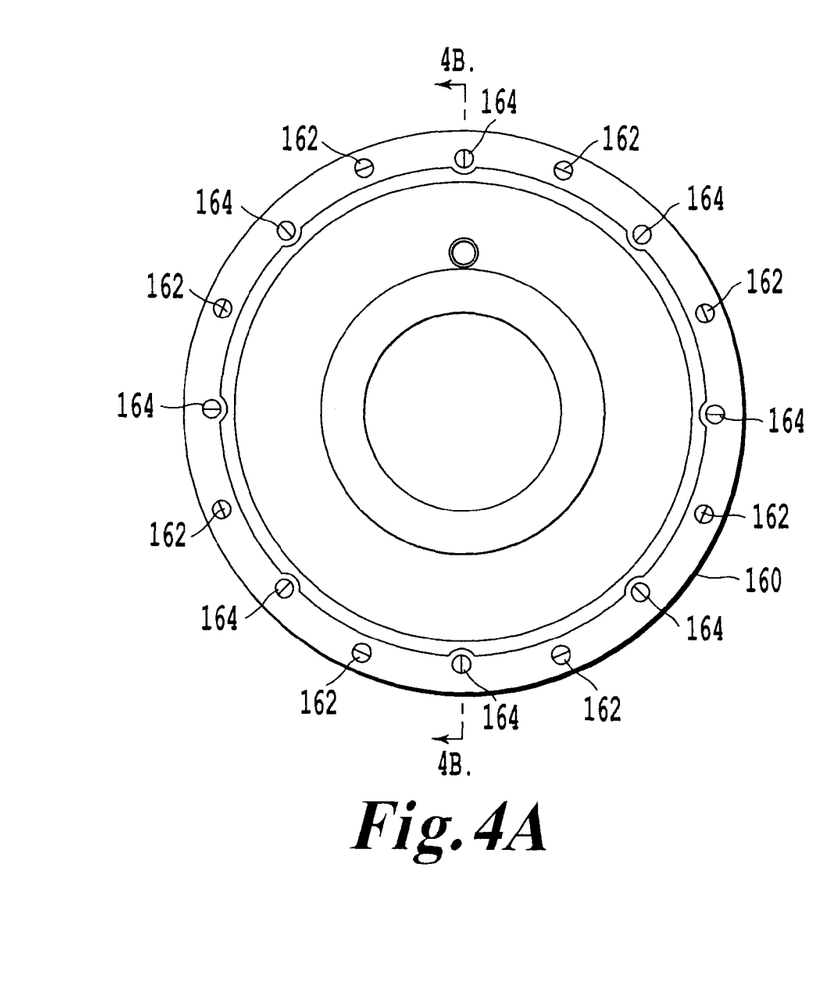
FIG. 4A is a plan view of a top housing.
Figure 4B:
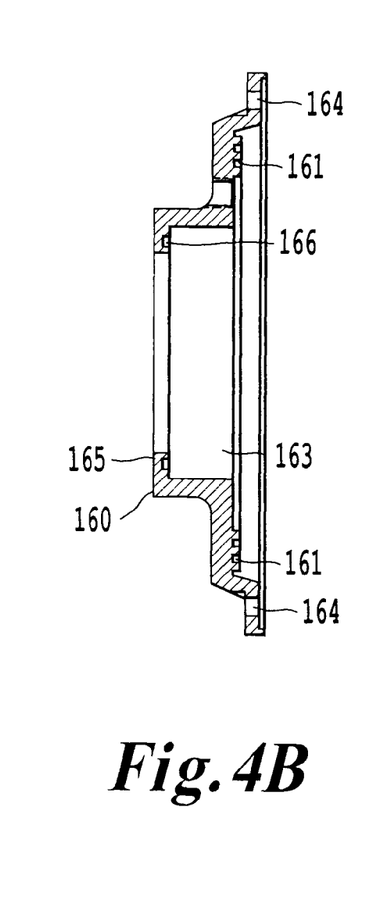
FIG. 4B is a cross-sectional view of the top housing.

The clutch system may include a drive source such as a drive pulley 20 (FIGS. 2A, 2B) that is rotated at a first speed due to a connection with an engine output shaft via a belt, chain, gear, or the like. The multi-speed clutch device 10 includes an input portion 100 that is directly or indirectly mounted to the drive pulley 20 so as to rotate at the first speed with the drive pulley 20. In this embodiment, the input portion 100 includes an input plate 140 (FIGS. 3A, 3B, 3C) and an top housing 160 (FIGS. 4A, 4B). The input plate 140 and the top housing 160 are removably mounted to the drive pulley 20 via mounting fasteners passing through mounting holes 22 in the drive pulley 20, mounting holes 142 in the input plate 140, and mounting holes 162 in the top housing 160. Attachment fasteners pass through attachment holes 144 of the input plate 140 and attachment holes 164 of the top housing 160. The mounting holes 142 in the input plate 140 pass through the entirety of its outer radial portion 143 while the attachment holes 144 pass through only a portion of the outer radial portion 143 of the input plate 140. The clutch device further includes an output portion 200 that can be actuated to engage or disengage with the input portion 100. For example, the output portion can include a piston 220 (FIGS. 5A, 5B) that is adjustable relative to the input portion 100 so as to shift the clutch ring 250 (FIGS. 6A, 6B) into engagement or disengagement with the opposing frictional surface 141 of the input plate 140. When the piston 220 is adjusted to shift the clutch ring 250 to the engaged position, the output portion 200 is urged to rotate at the first speed with the input portion 100 and the drive pulley 20. The clutch device also includes a viscous drive system 300 that urges the output portion 200 to rotate at a second speed different from the first speed when the piston 220 shifts the clutch ring 250 to the disengaged position. In this embodiment, the viscous drive system 300 includes a space 310 in which a shearing fluid between the clutch ring 250 and the top housing 160 is provided. The top housing 160 rotates with the drive pulley 20. The shearing fluid inside the space 310 transfers the shearing force generated from the rotation of the top housing 160 to the clutch ring 250, thus causing the clutch ring 250 to rotate at the second speed, which is less than the first speed.

The drive pulley 20 is rotatably coupled to a support shaft 30 by one or more bearings 71. A nut or collar device 72 is secured to the support shaft 30 and abuts the bearing 71 so that the bearings 71 remain substantially fixed in the axial direction relative to the support shaft 30. The drive pulley receives a belt, chain, gear, or the like in order to force the drive pulley 20 to rotate about an axis 15. In this embodiment, the support shaft 30 is substantially stationary, and the drive pulley 20 includes a belt engagement surface 21. Rotational power from a vehicle motor or the like may be transmitted through a belt (not shown) to the belt engagement surface 21, thereby urging the drive pulley 20 to rotate about the axis 15 of the support shaft 30.

A fluid supply channel 31 extends into the support shaft 30 for connection to a fluid supply reservoir (not shown). A supply channel 41 extends from the fluid supply channel 31 in a substantially axial direction along the axis 15. In this embodiment, the supply channel 41 extends through a cylindrical outlet 40. The cylindrical outlet 40 has an end face 42 that abuts an end face 52 of a seal member 50. A supply channel 51 extends through the seal member 50 and communicates with the supply channel 41 of the cylindrical outlet 40. The seal member 50 is fitted in a central orifice 62 of an air chamber cap 60. In some embodiments, the seal member 50 and the air chamber cap 60 may comprise metals, polymers, or composite materials that can substantially maintain a mechanical seal therebetween while the clutch device 10 is rotating relative to the support shaft 30.

The air chamber cap 60 includes an outer circumferential portion 64 which abuts a first inner portion of the drive pulley 20. A sealing device, such as an O-ring 66, may be placed in a groove 65 of the outer circumferential portion 64 of the air chamber cap 60. Accordingly, fluid may be transmitted from the fluid supply channel 31, through the supply channels 41, 51, and into a fluid-receiving chamber 90. The fluid transmitted to the fluid-receiving chamber 90 may be any suitable liquid or gas. Such fluids may be received, for example, from a pneumatic air supply system or a hydraulic oil supply system.

As shown in FIG. 1, the fluid-receiving chamber 90 is defined by the air chamber cap 60, the seal member 50, a clutch shaft 180, the piston 220, a ring 80, and interior surfaces of the drive pulley 20. The ring 80 provides a seal to prevent the fluid from escaping the fluid-receiving chamber 90. The ring 80 may be made of a deformable material, such as polymer or rubber, or a metal.

Figure 7A:
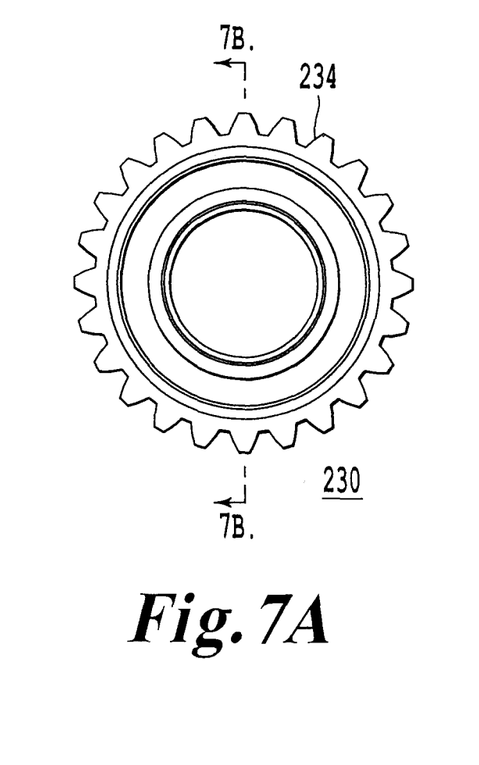
FIG. 7A is a plan view of a gear.
Figure 7B:
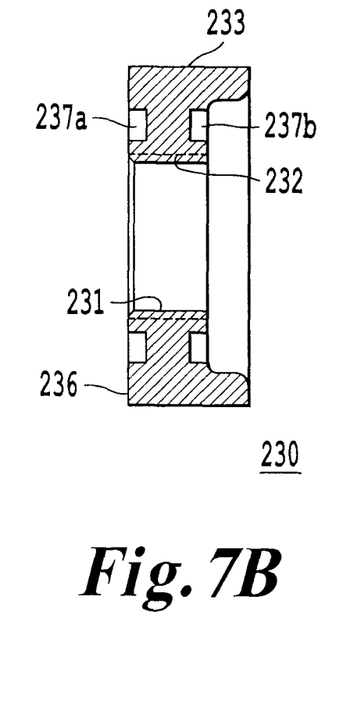
FIG. 7B is a cross-sectional view of the gear.

The clutch shaft 180 includes a first end portion 181, a middle portion 184, and a second end portion 187. The first end portion 181 includes splines 182. The splines 182 cooperate with splines 222 provided on an inner circumferential surface 221 of the piston 220 and splines 232 provided on an inner circumferential surface 231 of a gear 230 (FIGS. 7A, 7B). The piston 220 and the gear 230 are axially slidable along the first end portion 181 of the clutch shaft 180. The middle portion 184 of the clutch shaft 180 is fitted into a bearing 73. The middle portion 184 includes a shoulder 185. A nut 190 is threaded onto the second end portion 187 of the clutch shaft 180.

Figure 5A:
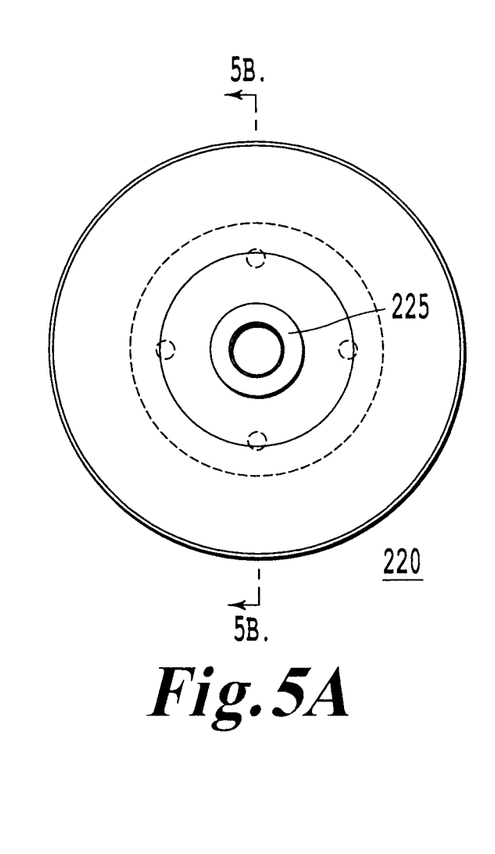
FIG. 5A is a plan view of a piston.
Figure 5B:
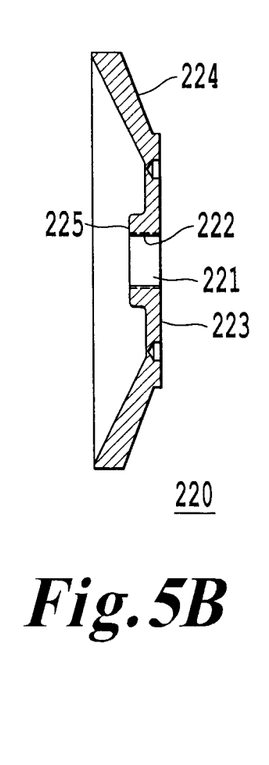
FIG. 5B is a cross-sectional view of the piston.
Figure 6A:
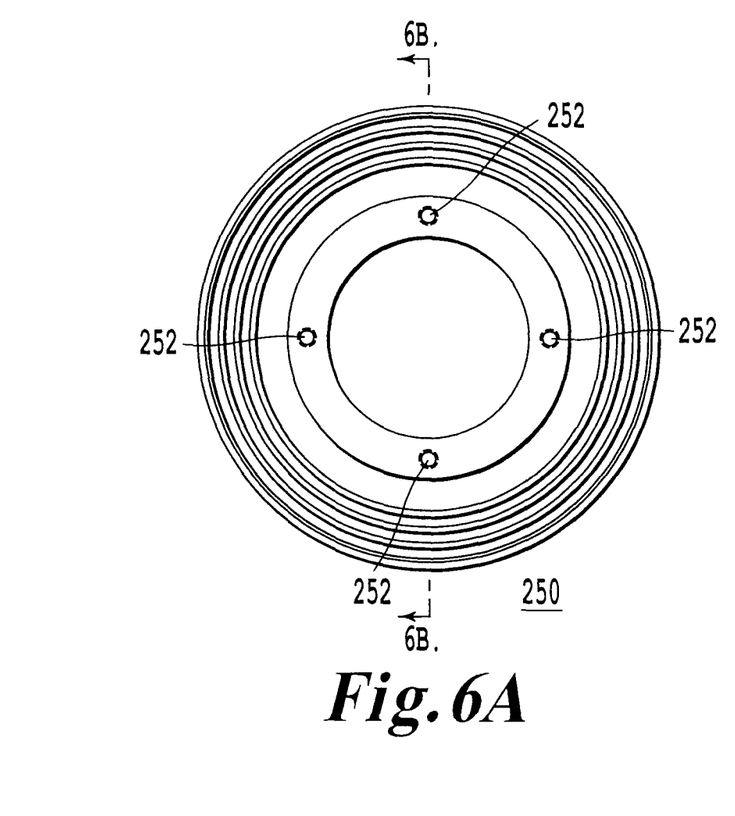
FIG. 6A is a plan view of a clutch ring.
Figure 6B:
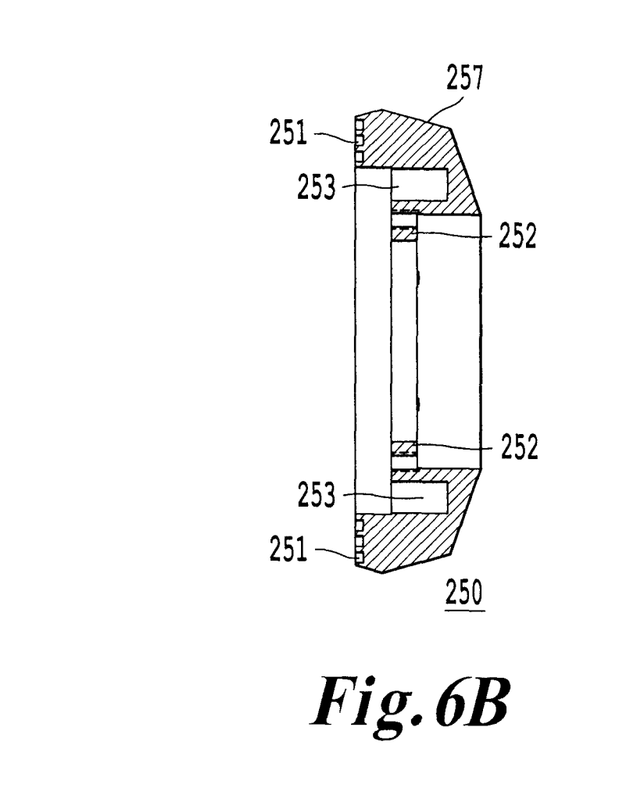
FIG. 6B is a cross-sectional view of the clutch ring.

The piston 220 includes an inner cylindrical portion 223 and a frustoconical portion 224 radially extending from the inner cylindrical portion 223.

The gear 230 includes teeth 234 provided at an outer circumferential surface 233. The teeth 234 cooperate with teeth 146 provided at an inner circumferential surface 145 of the input plate 140. The gear 230 includes a shoulder 235 which cooperates with a shoulder 225 of the piston 220. The gear 230 further includes grooves 237a, 237b. O-rings 238a, 238b may be placed in the grooves 237a, 237b.

As the input plate 140 is connected to the drive pulley 20 at its outer surface and is connected to the gear 230 at its inner surface, the clutch shaft 180 rotates at approximately the same speed as the input plate 140 and the drive pulley 20 (e.g., the first speed). Moreover, the piston 220 rotates at approximately the first speed, as the piston 220 is coupled to the clutch shaft 180 via the splines 222, 232.

The input plate 140 includes the opposing frictional surface 141 at an inner circumferential surface of its outer radial portion 143. A groove 1410 may be provided in the opposing friction surface 141 to catch worn materials due to the engagement of the engagement surface 257 of the clutch ring 250 and the opposing frictional surface 141 of the input plate 140. The input plate 140 may further include a groove 147 provided on an axial face at its inner portion. A sealing device, such as an O-ring 148, may be placed in the groove 147. The input plate 140 may further include a groove 149 provided at the outer radial portion 143 on an axial face in contact with the top housing 160. A sealing device, such as an O-ring 1490, may be placed in the groove 149.

The top housing 160 is attached to the input plate 140 and the drive pulley 20, as discussed above. The top housing 160 includes an inner circumferential surface 163 with a shoulder 165. The shoulder 165 may include a groove 166 in which a sealing device, such as an O-ring 167, may be placed.

Figure 8A:
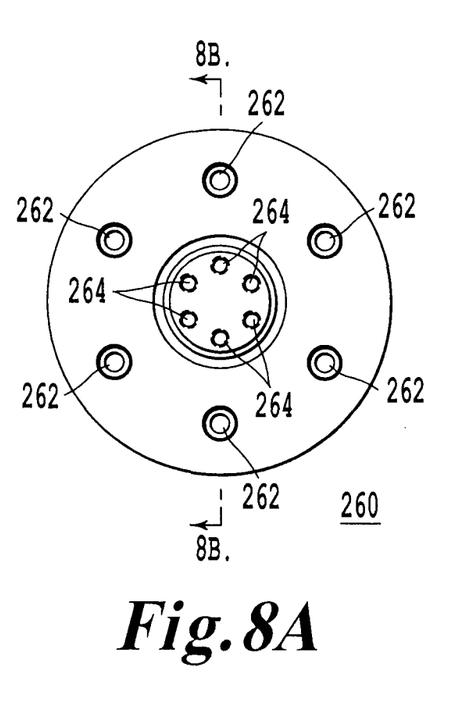
FIG. 8A is a plan view of a fan shaft.
Figure 8B:
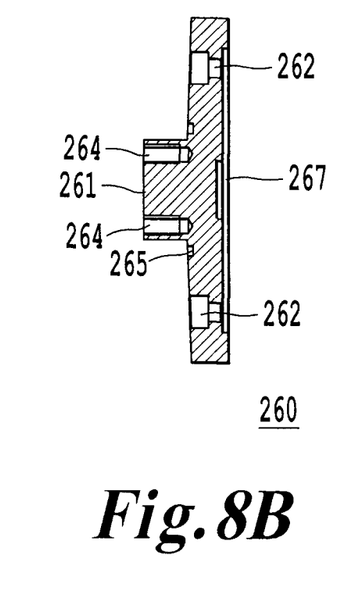
FIG. 8B is a cross-sectional view of the fan shaft.
Figure 9A:
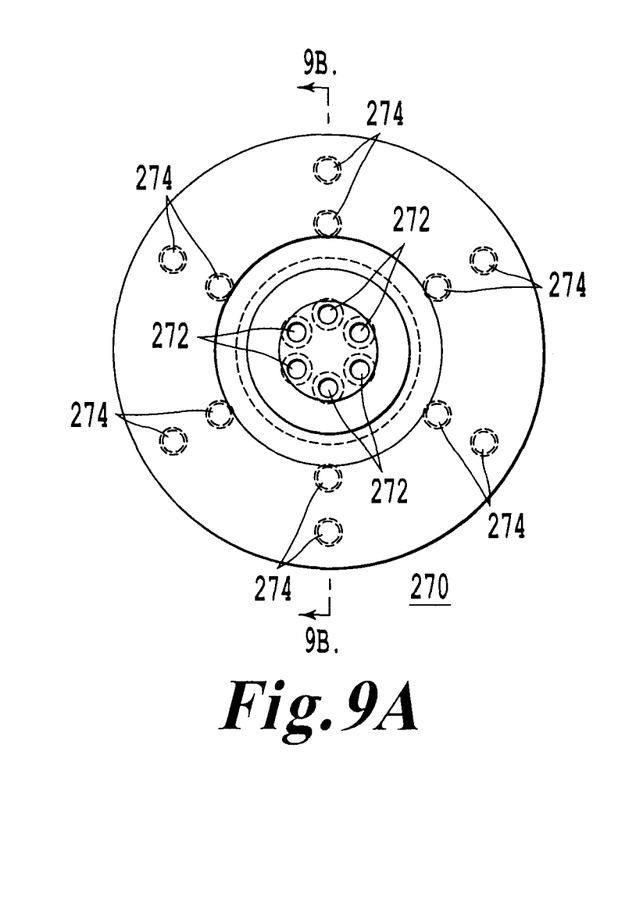
FIG. 9A is a plan view of a fan plate.
Figure 9B:
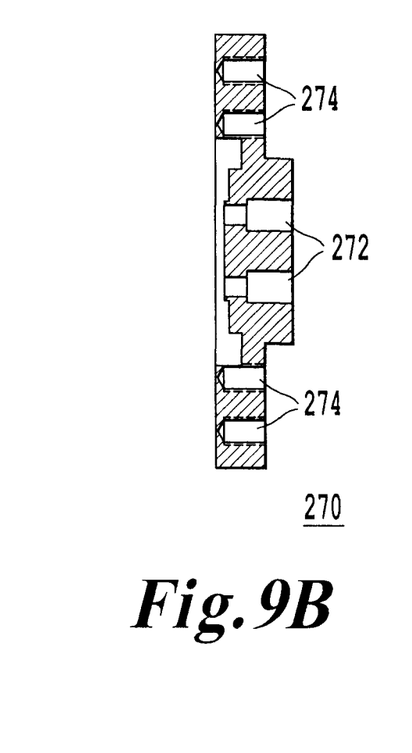
FIG. 9B is a cross-sectional view of the fan shaft.

The output portion 200 of the clutch device 10 includes the clutch ring 250, a fan shaft 260 (FIGS. 8A, 8B), and a fan plate 270 (FIGS. 9A, 9B). Attachment fasteners pass through attachment holes 252 of the clutch ring 250 and attachment holes 262 of the fan shaft 260 to connect the clutch ring 250 to the fan shaft 260. The clutch ring 250 includes a cavity 253 into which a spring 205 is placed. The spring 205 is sandwiched between the clutch ring 250 and the fan shaft 260. The spring 205 biases the clutch plate 250 in the engaged position so that an engagement surface 257 of the clutch plate 250 engages the opposing frictional surface 141 of the input plate 140.

The engagement surface 257 of the clutch plate 250 and the opposing frictional surface 141 of the input plate 140 may at least partially extend in a non-radial direction. For example, the engagement surface 257 and the opposing frictional surface 141 may be frustoconical. The radii of the engagement surface 257 and the opposing frictional surface 141 may increase at the surfaces 257, 141 extend toward the cooling fan 210. The engagement surface 257 may comprise a metallic, ceramic, or other material that is capable of providing frictional engagement and is capable of dissipating heat generated at the frictional interface. The engagement surface 257 may comprise a material having a static coefficient of friction in the range of approximately 0.1 to approximately 0.7, and in particular embodiments, may comprise a material having a static coefficient in the range of approximately 0.4 to approximately 0.5. The material for the engagement surface 257 may be similar or dissimilar to the material of the opposing frictional surface 141.

The shape and orientation of the engagement surface 257 and the opposing frictional surface 141 may provide the clutch device 10 with a conical wedging action. This conical wedging action may improve the engagement friction, thereby providing an increase in the torque transfer capabilities. Some embodiments of the clutch device 10 may provide torque ratings of approximately 2700 in-lbs, 2800 in-lbs, 2900 in-lbs, 3000 in-lbs or more, and particular embodiments may provide torque ratings in the range of approximately 3000 in-lbs to approximately 5000 in-lbs.

In other embodiments, a friction material may be superficially coupled to the engagement surface 257 via an adhesive, the friction material having a static coefficient of friction in the range of approximately 0.1 to approximately 0.7, and in particular embodiments, having a static coefficient in the range of approximately 0.4 to approximately 0.5.

A central portion 261 of the fan shaft 260 is placed in a bearing 75. The bearing 75 may be placed in the inner circumferential surface 163 of the top housing 160. A groove 265 may be provided on a surface of the fan shaft 260 at a radial distance from the central portion. A sealing device, such as an O-ring 266, may be placed in the groove 265. A surface of the fan shaft 260 opposite the surface with the groove 265 may include a cavity 267. The cavity 267 may be circular with a diameter that is slight larger than a diameter of the second end portion 187 of the clutch shaft 180. The fan shaft 260 includes attachment holes 264 for attaching the fan shaft 260 to the attachment holes 274 of the fan plate 270 via fasteners.

Figure 10A:
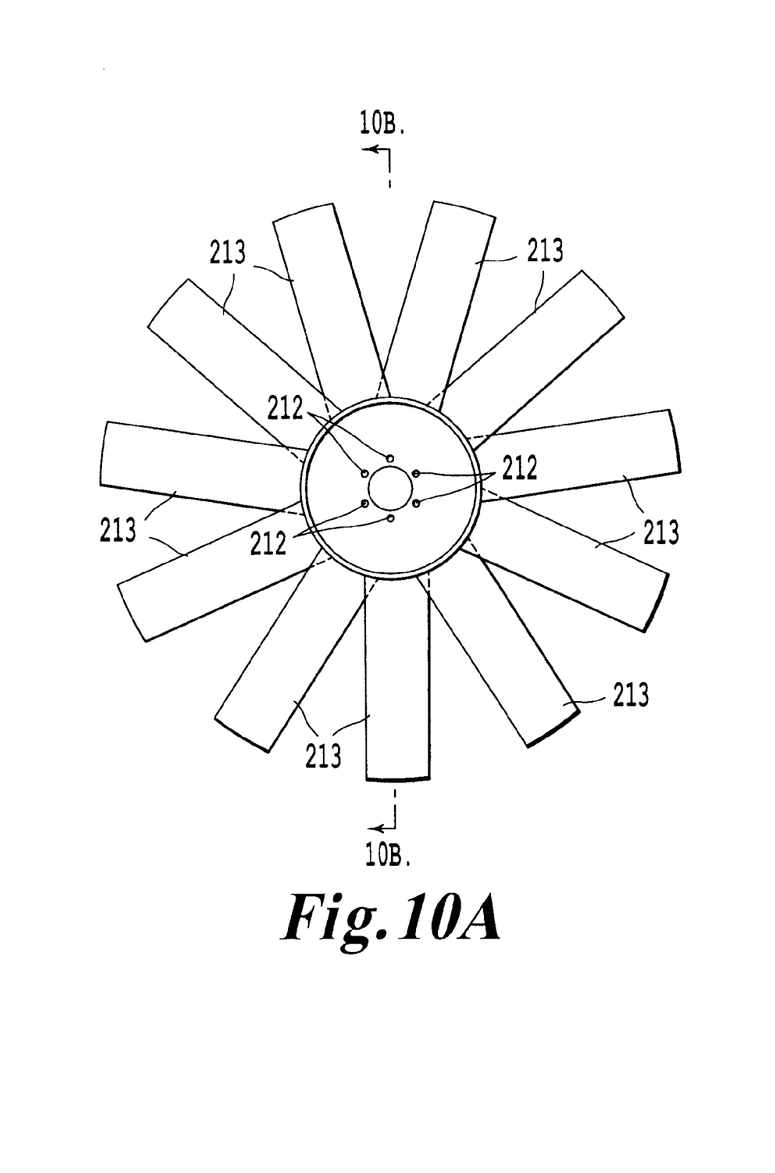
FIG. 10A is a plan view of a cooling fan device.
Figure 10B:
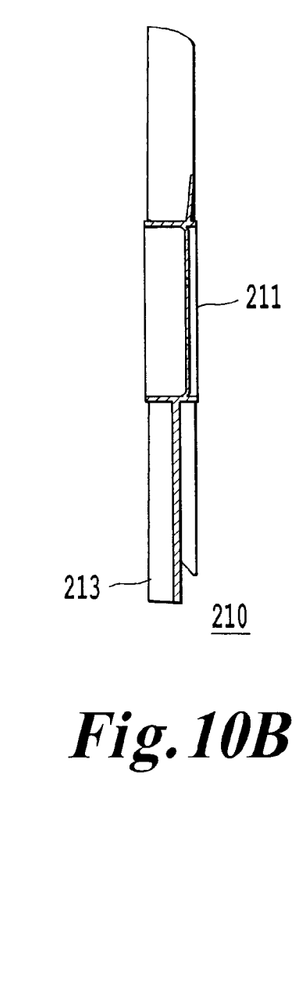
FIG. 10B is a cross-sectional view of the cooling fan device.

The fan plate 270 (FIGS. 10A, 10B) includes attachment holes 272 for attaching attachment holes 212 provided in a fan body 211 of the fan device 210 via fasteners. The fan device 210 includes a plurality of fan blades 213 attached to the fan body 211.

As the clutch ring 250, the fan shaft 260, and the fan plate 270 are connected together, the fan device 210 rotates at approximately the same speed as the clutch ring 250.

In the embodiment shown in FIG. 1, the multi-speed clutch device 10 may switch between the on-stage or drag-stage using an external pneumatic control system (not shown). To engage in the on-stage, an external solenoid valve (not shown) can shut off pressurized air flowing into the fluid-receiving chamber 90, thus biasing the piston 220 in a first position. In the absence of pressurized air, the force exerted by the spring 205 axially pushes the clutch ring 250 towards the opposing frictional surface 141 of the input plate 140. As the clutch ring 250 engages the input plate 140, the frictional force between the engagement surface 257 of the clutch ring 250 and the opposing frictional surface 141 of the input plate 140 urges the clutch ring 20, fan shaft 260, fan plate 270, and fan device 210 to rotate at the first rotational speed, providing maximum air flow from the fan device 210.

To engage in the drag-stage, the external solenoid valve provides pressurized air to the fluid-receiving chamber 90 via the fluid supply channel 31 and the supply channels 41. The pressure in the fluid-receiving chamber 90 causes the piston 220 to move axially away from the support shaft 30. In other words, the piston 220 moves towards the fan plate 270 along the clutch shaft 180. When the piston 220 moves towards the fan plate 270, the shoulder 225 of the piston 220 presses against the shoulder 235 of the gear 230. Since the gear 230 is axially slidable along the clutch shaft 180, the gear 230 moves towards the fan plate 270. The surface 236 of the gear 230 presses against the surface 186 of the clutch shaft 180, thereby moving the clutch shaft 180 towards the fan plate 270. The shoulder 185 of the clutch shaft 180 presses against the bearing 73 towards the fan plate 270. The bearing 73 presses against the clutch ring 250 with enough force to overcome the bias force of the spring 205, thereby disengaging the engagement surface 257 of the clutch ring 250 from the opposing frictional surface 141 of the input plate 140.

When the engagement surface 257 of the clutch ring 250 disconnects from the opposing frictional surface 141 of the input plate 140, the clutch ring 250, fan shaft 260, fan plate 270, and cooling fan 210 may no longer be driven at the first rotational speed. Instead, the viscous drive system 300 of the clutch device 10 causes the clutch ring 250 to rotate at a second rotational speed lower than the first rotational speed. In some implementations, the second rotational speed may be less than 15%, 10% to 25%, 20% to 35%, 30% to 45%, 40% to 55%, or 50% to 65% of the first rotational speed, for example, 30% of the first rotational speed.

The viscous drive system 300 includes a space 310 is provided between the top housing 160, the clutch ring 250, and the fan shaft 260. The shearing fluid is provided in the space 310. The distance of the space 310 between the top housing 160 and the clutch ring 250 may be hundredth or thousandths of an inch thick. For example, the distance of the space 310 may be between two and twenty thousandths of an inch.

The shearing fluid in the space 310 may be prevented from flowing out of the space due to the O-ring 266 in the groove 265 of the fan shaft 260, and the O-ring 1490 in the groove 149 of the input plate 140. The shearing fluid may be oil or a silicone gel, for example.

During the drag-stage of the clutch operation, the top housing 160 rotates at the speed of the drive pulley 20, or approximately the first rotational speed. The rotation of the top housing 160 imparts a shearing force on the shearing fluid. The shearing fluid inside the space 310 transfers the shearing force generated from the rotation of the top housing 160 to the clutch ring 250, thus causing the clutch ring 250 to rotate at the second rotational speed. The fan device 210 rotates at the same speed as the clutch ring, that is the second rotational speed, as the fan device 210 is connected to the clutch ring 250 via the fan shaft 260 and the fan plate 270. It may be possible to change the second rotational speed by altering one or more of the following: the viscosity of the shearing fluid, the amount of shearing fluid, the geometry of the top housing 160, the geometry of the clutch ring 250, or the distance of the space 310 between the top housing 160 and the clutch ring 250.

In some implementations, the surface area of the clutch ring 250 and the surface area of the top housing 160 may be increased by adding a series of matable lands and waves 251 on the clutch ring 250 and corresponding matable lands and waves 161 on the top housing 160. In some examples, the lands and waves 251, 161 may be created as rectangular "tooth" patterns, waves, truncated sawtooth patterns, or other patterning applied to the portions of the clutch ring 250 and the top housing 160 to increase the surface area in contact with the shearing fluid.

Although only certain embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

The invention claimed is:

1. A fan clutch device, comprising:
   an input member which is attached to a drive pulley so that the input member rotates with the drive pulley;
   an enclosure attached to the input member so that the enclosure rotates with the drive pulley;
   a piston which is movable between a first position and a second position;
   a clutch ring with an engagement surface provided on an outer circumference of the clutch ring which selectively engages an opposing surface of the input member provided on an inner circumference of the input member;
   a fan hub coupled to the clutch ring;
   a spring provided between the clutch ring and the fan hub;
   a fan member coupled to the fan hub; and
   a shearing fluid provided in an axial space between the enclosure and the clutch ring,
   wherein, when the piston is in the first position, the engagement surface of the clutch ring engages the opposing surface of the input member such that the clutch ring rotates at a first rotational speed substantially equal to a rotational speed of the drive pulley,
   wherein, when the piston is in the second position, the engagement surface of the clutch ring disengages the opposing surface of the input member, and a shearing force, provided by the shearing fluid due to rotation of the enclosure, rotates the clutch ring at a second rotational speed less than the first rotational speed, and
   wherein the axial space between enclosure and the clutch ring is disposed radially outward of the spring, and attachment fasteners which couple the clutch ring and the fan hub are disposed radially inward of the spring.

2. The fan clutch device according to claim 1, wherein the engagement surface of the clutch ring and the opposing surface of the input member are frustoconical.

3. The fan clutch device according to claim 1, wherein the enclosure and the clutch ring include matable non-planar surfaces.

4. The fan clutch device according to claim 1, further comprising a clutch shaft to which the piston is coupled.

5. The fan clutch device according to claim 4, further comprising a gear coupled to the clutch shaft and coupled to the input member.

6. The fan clutch device according to claim 4, further comprising a fluid-receiving chamber defined by the piston, the clutch shaft, and interior surfaces of the drive pulley.

7. The fan clutch device according to claim 1, wherein the spring is disposed in a cavity of the clutch ring.

8. A method for operating a fan clutch device, comprising:
   operating the fan clutch at a first rotational speed when a first operating condition is satisfied; and
   operating the fan clutch at a second rotational speed less than the first rotational speed when a second operating condition is satisfied,
   wherein the fan clutch comprises:
      an input member which is attached to a drive pulley so that the input member rotates with the drive pulley;
      an enclosure attached to the input member so that the enclosure rotates with the drive pulley;
      a piston which is movable between a first position and a second position;
      a clutch ring with an engagement surface provided on an outer circumference of the clutch ring which selectively engages an opposing surface of the input member provided on an inner circumference of the input member;
      a fan hub coupled to the clutch ring;
      a spring provided between the clutch ring and the fan hub;
      a fan member coupled to the fan hub; and
      a shearing fluid provided in an axial space between the enclosure and the clutch ring,
      wherein, when the piston is in the first position, the engagement surface of the clutch ring engages the opposing surface of the input member such that the clutch ring rotates at the first rotational speed substantially equal to a rotational speed of the drive pulley,
   wherein, when the piston is in the second position, the engagement surface of the clutch ring disengages the opposing surface of the input member, and a shearing force, provided by the shearing fluid due to rotation of the enclosure, rotates the clutch ring at the second rotational speed, and
   wherein the axial space between enclosure and the clutch ring is disposed radially outward of the spring, and attachment fasteners which couple the clutch ring and the fan hub are disposed radially inward of the spring.

9. The fan clutch device according to claim 1, wherein the enclosure includes:
   an outer radial portion including attachment holes substantially aligned with attachment holes of the input member,
   an inner radial portion surrounding a bearing, and
   an intermediate portion between the outer radial portion and the inner radial portion, and
   wherein the enclosure is in front of the clutch ring in an axial direction such that a rear axial surface of the intermediate portion cooperates with a front axial surface of the clutch ring to provide the axial space for the shearing fluid.

* * * * *